United States Patent
Yang et al.

(10) Patent No.: US 8,329,807 B2
(45) Date of Patent: Dec. 11, 2012

(54) LATEX PAINT FILM RESISTANT TO ADVERSE EFFECTS OF WATER, AND COMPOSITIONS AND METHODS FOR MAKING SAME

(75) Inventors: Yong Yang, Piscataway, NJ (US); Mohammad Asif, Middletown, NJ (US); Robert J. Sheerin, North Caldwell, NJ (US)

(73) Assignee: Columbia Insurance Company, Omaha, NE (US)

( * ) Notice: Subject to any disclaimer, the term of this patent is extended or adjusted under 35 U.S.C. 154(b) by 1149 days.

(21) Appl. No.: 11/193,131

(22) Filed: Jul. 29, 2005

(65) Prior Publication Data

US 2006/0030662 A1 Feb. 9, 2006

Related U.S. Application Data

(63) Continuation-in-part of application No. 10/728,599, filed on Dec. 4, 2003.

(60) Provisional application No. 60/596,366, filed on Aug. 18, 2003.

(51) Int. Cl.
 *C09D 5/00* (2006.01)
(52) U.S. Cl. ...................................................... 524/501
(58) Field of Classification Search .................... 524/501
 See application file for complete search history.

(56) References Cited

U.S. PATENT DOCUMENTS

| | | | |
|---|---|---|---|
| 3,769,247 A | 10/1973 | Glomski et al. | |
| 4,138,381 A | 2/1979 | Chang et al. | |
| 4,348,294 A * | 9/1982 | King .............................. 510/257 |
| 4,384,096 A | 5/1983 | Sonnabend | |
| 4,421,902 A | 12/1983 | Chang et al. | |
| 4,423,199 A | 12/1983 | Chang et al. | |
| 4,432,881 A | 2/1984 | Evani | |
| 4,529,773 A | 7/1985 | Witiak et al. | |
| 4,569,965 A | 2/1986 | Engel et al. | |
| 4,600,761 A | 7/1986 | Ruffner et al. | |
| 4,616,074 A | 10/1986 | Ruffner | |
| 4,892,916 A | 1/1990 | Hawe et al. | |
| 5,527,614 A | 6/1996 | Carpenter et al. | |
| 5,770,760 A | 6/1998 | Robinson | |
| 5,874,495 A | 2/1999 | Robinson | |
| 6,248,805 B1 | 6/2001 | Nguyen et al. | |
| 6,337,366 B1 | 1/2002 | Amick et al. | |
| 6,355,727 B1 | 3/2002 | Andrist et al. | |
| 6,531,537 B2 * | 3/2003 | Friel et al. ..................... 524/497 |
| 6,602,948 B2 | 8/2003 | Harris et al. | |
| 6,762,269 B1 | 7/2004 | Maxim, Jr. et al. | |
| 6,812,278 B2 | 11/2004 | Harris et al. | |
| 6,887,928 B2 | 5/2005 | Tanzer et al. | |
| 7,217,443 B2 | 5/2007 | Bobsein et al. | |
| 2003/0176569 A1 | 9/2003 | Tanzer et al. | |
| 2003/0187103 A1 | 10/2003 | Bloom et al. | |
| 2005/0038557 A1 | 2/2005 | Friel et al. | |
| 2005/0039635 A1 | 2/2005 | Yang et al. | |

FOREIGN PATENT DOCUMENTS

| | | |
|---|---|---|
| EP | 0011806 | 11/1980 |
| EP | 1245644 | 10/2002 |
| EP | 1293545 | 3/2003 |
| EP | 1371688 | 12/2003 |
| GB | 2005697 | 4/1979 |
| WO | WO 2005/019353 | 3/2005 |

* cited by examiner

*Primary Examiner* — Vickey Nerangis
(74) *Attorney, Agent, or Firm* — Troutman Sanders LLP.

(57) ABSTRACT

A colorant composition containing a hydrophobic latex polymer component to impart resistance to water-softening and -staining in a paint film made from a latex paint formulated with the colorant composition, as well as the paint and paint film, and methods for making the foregoing.

17 Claims, No Drawings

LATEX PAINT FILM RESISTANT TO ADVERSE EFFECTS OF WATER, AND COMPOSITIONS AND METHODS FOR MAKING SAME

This application is a continuation-in-part of U.S. application Ser. No. 10/728,599, filed Dec. 4, 2003, and underlying U.S. Provisional Application No. 60/596,366, filed Aug. 18, 2003, the disclosure of each such application being incorporated herein by reference in its entirety.

FIELD OF THE INVENTION

The present invention relates to water-base colorant technology, including without limitation latex paints, films produced from such paints, precursor compositions (including colorant compositions) for such paints, and methods for making the foregoing.

BACKGROUND OF THE INVENTION

Latex paints have gained market share, especially (thought not solely) in respect of architectural coatings, among other things because of environmental concerns with solvent-based paints. This is a consequence of the fact that latex paints exhibit desirable characteristics which are environmentally friendly compared to those of solvent-based paints. However, there are some properties of conventional latex paint and films produced from them that are problematic. For instance, in order to achieve suitable color pigment dispersion in latex paint and precursor colorant compositions therefor, it is typical to incorporate a significant amount of one or more surfactants and/or one or more dispersants. These surfactants and dispersants contain hydrophilic as well as hydrophobic segments or portions for wetting the pigment material (as closed) and dispersing it in the latex paint's aqueous phase. Relatively speaking the amount of surfactants and/or dispersants in deeper-color and clear-base paints is even greater due to the need to tint the paint with a large amount of colorant(s). A paint film produced from latex paint having a significant amount of surfactant- and/or dispersant-content is prone to absorb water unduly, which leads to swelling and softening of the paint film and damage to the film when water on its surface is removed by wiping or the like; this is because the hydrophobic portions of the surfactants and dispersants are not sufficient to override the water-attractive properties of the hydrophilic portions. Additionally, a conventional latex paint film can also be disadvantageous as a consequence of the water affinity of the surfactants and dispersants contained therein because they may leach to the surface of the paint film when it is in contact with water—for example, during water-cleaning thereof—leaving visible water stains on the paint film surface.

A further difficulty encountered with latex paint and films produced therefrom is gloss level impairment. Since gloss level depends on the type and amount of pigment utilized, large amounts of color pigment or extender pigment in colorant compositions can decrease gloss level of a film produced from a latex paint tinted with such colorant composition. Additionally, the incorporation of such pigment may decrease gloss level to a different extent from one color to another. A loss of uniformity exacerbates gloss-level disadvantage.

Moreover, the capacity of latex paint to exhibit good flow and leveling properties to provide a paint film with a smooth finish that is substantially free of brush marks (which is particularly desirable for high gloss paints) can be undercut because of the limitations of various types of thickeners typically utilized in latex paint to achieve desirable flow and leveling characteristics, i.e., a favorable rheology. More specifically, latex paints incorporating associative thickeners such as hydrophobically modified ethylene oxide urethane rheology modifiers ("HEURs") exhibit good flow/leveling characteristics. Other thickeners, such as cellulose ethers, hydrophobically modified cellulose ethers, alkali soluble or swellable emulsions, and hydrophobically modified alkali soluble or swellable emulsions, can cause the low/leveling characteristics of the paint to depart from an optimal level.

It would be highly advantageous if there were available a latex paint film, as well as a latex paint (and a precursor colorant composition therefor) which produces such paint film, not subject to the water-sensitivity or staining, gloss-impairment, and rheology-change which can characterize conventional latex paint films and paints utilized to produce same, especially deep and clear tint-base paints.

OBJECTS OF THE INVENTION

It is an object of the invention to provide a colorant composition which is suitable for formulation of a tint-base latex paint that yields a tinted paint film with good resistance to water softening and staining phenomena, as well as to provide such paint and film.

It is a further object of the invention to provide a colorant composition which is suitable for formulation of a tint-base latex paint that yields a tinted paint film with good gloss characteristics, as well as to provide such paint and film.

It is a further object of the invention to provide a colorant composition which is suitable for formulation of a tint-base latex paint that yields a tinted paint film relatively free of brush marks, as well as to provide such paint, especially one with good rheological properties, and such film also.

It is yet another object of the invention to provide a colorant composition which is suitable for formulation of a tint-base latex paint that yields a tinted paint film resistant to color rub-up, as well as to provide such paint and film.

It is still another object of the invention to provide methods for formulating such colorant composition, paint and film.

SUMMARY OF THE INVENTION

In general, the foregoing and other objects are advantageously achieved by the invention as follows:

In one favorable aspect, the invention is in a colorant composition suitable for combining with a component comprising a film-forming binder latex to form a latex paint including a surfactant, a dispersant, or a surfactant and a dispersant, at least one said surfactant or dispersant having one or more hydrophilic segments and one or more hydrophobic segments, which colorant composition comprises water, a colorant, and a component including an amount of at least one hydrophobic latex polymer which when aggregated in said latex paint with an effective amount of said binder latex would constitute a total mass of latex greater than required for producing a latex paint film.

In another favorable aspect, the invention is in a latex paint formed from: a component including an amount of a film-forming binder latex sufficient to produce a paint film upon drying; and a colorant composition which comprises water, at least one colorant, one or more surfactants, one or more dispersants, or one or more surfactants and one or more dispersants, at least one said surfactant or dispersant having one or more hydrophilic segments and one or more hydrophobic segments, and a component including an amount of at least one hydrophobic latex polymer which when aggregated in said latex paint with said amount of a binder latex constitutes a total mass of latex greater than required for producing a latex paint film.

In yet another favorable aspect, the invention is in a paint film which comprises the dried product of a latex paint formed from: a component including an amount of a film-forming binder latex sufficient to produce a paint film upon drying; and a colorant composition which comprises water, at least one colorant, one or more surfactants, one or more dispersants, or one or more surfactants and one or more dispersants, at least one said surfactant or dispersant having one or more hydrophilic segments and one or more hydrophobic segments, and a component including an amount of at least one hydrophobic latex polymer which when aggregated in said latex paint with said amount of a binder latex constitutes a total mass of latex greater than required for producing a latex paint film.

Furthermore, in an even broader sense, the invention extends to the following:

A latex paint comprising: water; a component including an amount of a film-forming binder latex sufficient to produce a paint film upon drying; a colorant; a surfactant, a dispersant, or a surfactant and a dispersant, at least one said surfactant or dispersant having one or more hydrophilic segments and one or more hydrophobic segments; and a component including an amount of a hydrophobic latex polymer which when aggregated in said latex paint with said amount of a binder latex constitutes a total mass of latex greater than required for producing a latex paint film.

A latex paint film which comprises the dried product of a latex paint, said paint including: water; a component including an amount of a film-forming binder latex sufficient to form such paint film; a colorant; a surfactant, a dispersant or a combination of a surfactant and a dispersant, at least one said surfactant or dispersant having one or more hydrophilic and one or more hydrophobic segments; and a component including an amount of a hydrophobic latex polymer which when aggregated in said latex paint with said amount of the film-forming binder latex constitutes a total mass of latex greater than required for producing said paint film.

With reference again now to advantageous embodiments for achieving the objectives of the invention:

In a further favorable aspect, the invention is in a method of making a colorant composition suitable for combining with a component comprising a film-forming binder latex to form a latex paint including a surfactant, a dispersant, or a surfactant and a dispersant, at least one said surfactant or dispersant present in the composition having one or more hydrophilic segments and one or more hydrophobic segments, which method comprises mixing water, at least one colorant, and a component including an amount of at least one hydrophobic latex polymer which when aggregated in said latex paint with an effective amount of said binder latex would constitute a total mass of latex greater than required for forming a latex paint film.

In a still further favorable aspect, the invention is in a method of making a latex paint, which comprises: mixing a base component including an amount of a film-forming binder latex sufficient to produce a paint film upon drying; and a colorant composition comprising water, at least one colorant, one or more surfactants, one or more dispersants, or one or more surfactants and one or more dispersants, at least one said surfactant or dispersant having one or more hydrophilic segments and one or more hydrophobic segments, and a component including an amount of at least one hydrophobic latex polymer which when aggregated in said latex paint with said amount of a binder latex constitutes a total mass of latex greater than required for forming a latex paint film.

In yet a further favorable aspect, the invention is in a method of making a latex paint film, which comprises applying to a surface a latex paint formed from: a base component comprising an amount of a film-forming binder latex suitable for producing a paint film; and a colorant composition which comprises water, at least one colorant, one or more surfactants, one or more dispersants, or one or more surfactants and one or more dispersants, at least one said surfactant or dispersant having one or more hydrophilic segments and one or more hydrophobic segments, and a component including an amount of at least one hydrophobic latex polymer which when aggregated in said latex paint with said amount of a binder latex constitutes a total mass of latex greater than required for forming a latex paint film.

And, once more in a broader sense, the invention extends to the following:

A method of making a latex paint, which comprises combining: a base component comprising an amount of a film-forming binder latex suitable for forming a paint film; water; a colorant; a surfactant, a dispersant, or a surfactant and a dispersant, at least one said surfactant or dispersant having one or more hydrophilic segments and one or more hydrophobic segments; and a component including an amount of a hydrophobic latex polymer which when aggregated in said latex paint with said amount of a binder latex constitutes a total mass of latex greater than required for producing a latex paint film.

A method of making a latex paint film, which comprises applying to a surface a latex paint containing: water; a component including an amount of a film-forming binder latex sufficient to produce a paint film upon drying; a colorant; a surfactant, a dispersant, or a surfactant and a dispersant, at least one said surfactant or dispersant having one or more hydrophilic segments and one or more hydrophobic segments; and a component including an amount of a hydrophobic latex polymer which when aggregated in said latex paint with said amount of a binder latex constitutes a total mass of latex greater than required for producing a latex paint film.

Practice of the invention confers several significant advantages. Because of the incorporation of hydrophobic latex polymer over and above that amount of material required for forming latex paint film, there is a hydrophobic component that acts to resist absorption of water. Thus, water does not pervade the latex paint film of the invention, even when that film is subjected to water-cleaning or other substantial water-contact, as would otherwise occur. This mitigates water-softening and staining effects which are highly undesirable. (For purposes of this disclosure, and throughout the same, the term "mitigate" and any derivative or variation thereof shall mean causing to become less harsh, hostile, severe, or otherwise adverse.) Additionally, with the invention the gloss-level decrease which can occur in conventional latex paint films is mitigated due to the incorporation of a hydrophobic latex polymer component in accordance with the invention (this applies both to the decrease in general, and variation of the amount of decrease from one color to another), resulting from the reduction of colored or extender pigment content. Furthermore, viscosity of the hydrophobic latex polymers is very low even at a solids content of over 50%, with the result that the hydrophobic latex polymer component can be added with relative impunity in as great an amount as reasonably necessary. Also, hydrophobic latex polymers associate with thickeners which can change the flow/leveling characteristics of tinted latex paints and precursor colorant compositions therefor with the result that the rheology-changing effects of those thickeners are blunted. These and other advantages of practicing the invention will be treated further in the detailed discussion hereinafter.

DETAILED DESCRIPTION OF CERTAIN PREFERRED EMBODIMENTS OF THE INVENTION

The present invention is directed inter alia to the provision of colorant compositions suitable for formulation of tint-base latex paints that yield superior dried tinted latex paint coatings (i.e., films), as well as to such latex paints and coatings.

The coatings or films in accordance with the invention are produced by application of the latex paint to a surface or substrate; the paint can then cure to form such coating or film, typically via drying, preferably air-drying (as used herein, the term "dry" and any variation or derivative thereof is intended to refer to a decrease in overall water content and/or an act effecting same, but does not require the complete removal of water).

As will be discussed more fully hereinafter, in addition to a critical hydrophobic latex polymer content (which can be present as a polymer dispersion) the inventive embodiments typically comprise (as necessary or advantageous) a range of other components. Thus, the inventive colorant compositions contain not only a hydrophobic latex polymer (which can be present as a dispersion of the polymer) but can also contain one or more colorants (e.g., one or more colored and/or extender pigments), one or more surfactants and/or dispersants, and even in some cases a film-forming latex binder component, though the colorant composition embodiments in most instances do not contain film-forming latex binder amounts sufficient for the formation of a suitable paint film. Further optional components can also be incorporated, such as one or more water-dispersible polymers, one or more low number average molecular weight polymers (such as polyethylene glycol or polypropylene glycol) each with an average molecular weight below about 1000 Daltons, and one or more rheology modifiers, for instance thickeners, especially associative thickeners, and in the latex paint at least one oxygenated solvent. Like the inventive colorant compositions, the latex paint and paint film contain not only a hydrophobic latex polymer but also contain one or more colorants, surfactants and/or dispersants, and one or more of the optional components as aforesaid, its being understood that the latex paint can also contain a water solvent component, and at least one oxygenated solvent (as well as at least one coalescence solvent). And, of course, the latex paint and paint film contain a film-forming latex binder component in amount sufficient for the formation of a suitable paint film (self-evidently, the film-forming binder latex in a paint film embodiment can be in the cured "film" state).

As will likewise be explained in more detail hereinafter, the present invention also permits the incorporation of a copolymeric surfactant as disclosed in U.S. application Ser. No. 10/728,599, filed Dec. 4, 2003. The incorporation of such copolymeric surfactant (typically in the colorant composition initially) imparts viscosity stability—i.e., mitigates any change in viscosity between that of an initial composition (e.g., a base composition) and a composition resulting from combination with the initial composition of yet another composition (e.g., a colorant composition).

Thus, a central feature of the present invention is the incorporation in a colorant composition, in a latex paint and in a film produced from a latex paint, of a hydrophobic latex polymer component in an amount effective to mitigate the absorption by such paint film of water which would otherwise lead to softening and/or staining of the film as mentioned in the preceding discussion. Of course, use of such amount of the hydrophobic latex polymer is also a significant feature of the method embodiments of the invention. The invention resides not simply in the presence of or utilization of some latex polymer in the aforementioned embodiments, but rather in a sufficient amount of hydrophobic latex polymer over and above the latex polymer content necessarily incorporated to produce the eventual film itself. Those of ordinary skill in the art, when in possession of the teachings herein, will recognize that binder latex materials are usually selected for film-forming capability, whereas the hydrophobic latex polymer of the present invention is selected for its disaffinity in respect of water; accordingly, in many instances the formulations of such latex components will be different for the purpose of maximizing each one's different function, but this is not always the case as in certain embodiments the formulations overlap or are substantially the same.

Another important feature of certain good embodiments of the invention is better control of the viscosity of a colorant composition. More specifically, conventional colorant compositions for tint-base paints use contain inorganic extender pigments, such as silicates, to control the viscosity. But, extender pigments in colorant compositions will reduce gloss of latex paint films. Theoretically, thickeners can be used for control the viscosity of colorant compositions. However, the types of thickeners used for colorant compositions will affect the optimum rheology of latex paints ultimately. For instance, cellulose and alkali swellable emulsion based thickeners will negatively affect the flow/leveling of latex paints. Associative thickeners such as HUERs are not effective to associate with color pigments, especially for inorganic pigments and therefore are not efficient to build viscosity in colorant compositions. On the other hand, the hydrophobic latex polymer incorporated in a colorant composition will demonstrate affinity with an associative thickener more effectively and thus provide a better control of the viscosity of colorant compositions and an enhancement of the flow/leveling characteristics of latex paints.

It is the aforementioned hydrophobic latex polymer content which confers the benefits and advantages of the invention. More specifically, it is this further amount of latex polymer which counters the aggregate hydrophilicity of the other components in the ultimate paint film (dry) and accordingly mitigates the absorption of water and/or migration of surfactants/dispersants, with resultant decreased water softening and staining. Beyond this, the incorporation of a hydrophobic latex polymer component in such amount can mitigate loss of gloss-level, and variation of gloss-level from one color to another as well. At the same time, however, the hydrophobic latex polymer component can be incorporated in whatever amount is necessary or desirable because its viscosity is very low, and thus its viscosity-raising effect is typically negligible or at least tolerable. Also, when one or more thickeners is present, as is typical, the amount of hydrophobic latex polymer component effective to mitigate water softening and staining is correspondingly sufficient to associate with those thickeners such that their rheology-changing tendencies are mitigated.

As used herein, the expressions "hydrophobic latex polymer" shall be deemed to encompass species comprising one or more repeating monomeric subunits, which species in the overall do not sorb (e.g., absorb or adsorb) water but rather repel or otherwise have a disaffinity for same, and which take the form of a dispersion in an aqueous environment. The term "hydrophobic latex polymer" shall further be deemed for the purpose of this application to encompass the hydrophobic latex polymer component in any form compatible with practice of the invention, including without limitation a dispersion of such polymer, e.g., an aqueous dispersion (its being understood that the amount of the polymer component utilized as the basis for calculation of weight percents, ratios, etc. shall be the hydrophobic latex polymer solids content per se, irrespective of the form in which it is presented and/or other substances, such as solvents or dispersants which may accompany the polymer solids). As used in this application, the term "polymer" includes both a homopolymer and a copolymer.

Of course, the essential factor in respect of the amount of hydrophobic latex polymer component incorporated according to the invention is how much of that material need be present in a paint film produced from the latex paint of the invention to be effective in achieving the desired mitigation of water-softening and staining phenomena. Optimally, the mitigation level is substantial elimination of the undesirable characteristics, but in certain good embodiments those characteristics are decreased at least by 25%, preferably 50%, especially 80%, as compared with results when the inventive hydrophobic latex polymer component is not present. Once in possession of the teachings concerning the instant invention, one of ordinary skill in the art will be able to determine by empirical means and without undue experimentation the amount of hydrophobic latex polymer component in the paint film of the present invention sufficient to obtain the desired effect, and therefore correspondingly in the colorant composition, latex paint, and methods of the present invention. Typically, prior to drying, the hydrophobic latex polymer constitutes from 0.025 to 15 weight percent, preferably 0.05 to 10 weight percent, and especially 0.075 to 7.5 weight percent, of the paint. After drying, the amount of hydrophobic latex polymer in the paint film is typically 0.05 to 30 weight percent, preferably 0.1 to 20 weight percent, of the aggregate constituents of the paint film. Since the latex paint itself has not yet dried into a paint film, and rather includes a solvent component which is absent (due to evaporation) from the paint film, the weight percent of hydrophobic latex polymer in the latex paint itself is typically less than the weight percent of that component in the paint film. In other words, the weight percent of hydrophobic latex polymer in the water-based latex paint is therefore less than that in the dry paint film by a predictable amount, i.e., by a factor which is a function of the amount of anticipated solvent evaporation from the paint itself to produce the paint film. On the other hand, because a precursor colorant composition in accordance with the invention is typically added to a base composition for the purpose of making the latex paint, the colorant composition is diluted in such operation. Depending on the anticipated extent of dilution, and—if the colorant composition is in the form of a concentrate—concomitantly on the degree of concentration, the colorant composition often contains a higher percent by weight of the hydrophobic latex polymer component than the wet paint itself, so that the paint formulated with the colorant composition will have the desired constituent amount of hydrophobic latex polymer. The amount of hydrophobic latex polymer component typically incorporated in colorant compositions of the invention is 0.25 to 25 weight percent, preferably 0.5 to 20 weight percent, especially 0.75 to 15 weight percent, of the aggregate constituents of the colorant composition.

The amount of hydrophobic latex polymer utilized in connection with the invention can conveniently be related to the amount of colorant, and in instances where extender pigment is utilized, to the amount of colorant including extender pigment in the aggregate. The weight ratio of hydrophobic latex polymer (calculated based on the amount of the polymer solids per se irrespective of its physical form or environment, such as being present in a dispersion) to colorant is preferably in a range of 0.075:1 to 7.5:1. The ratio of hydrophobic latex polymer (calculated as above) to the aggregate amount of colorant including extender pigment (if present) is preferably in a range of 0.01 to 0.075. Furthermore, the amount of hydrophobic latex polymer utilized in connection with the invention can conveniently be related to the amount of polymeric surfactant (if such component is utilized) as disclosed herein and in parent U.S. application Ser. No. 10/728,599 as aforesaid. The ratio of hydrophobic latex polymer (calculated as above) to the polymeric surfactant is preferably in a range of 0.5 to 1.0.

Once in possession of the teachings herein concerning the present invention, one of ordinary skill in the art will be able to determine suitable substances for utilization in the hydrophobic latex polymer component without undue experimentation. Typically, this component need be no more than one polymer which can be made up of one, two, three or more monomers. However, it is within the scope of the invention to employ a plurality of hydrophobic latex polymers as such component. The hydrophobic latex polymers incorporated in accordance with the invention can, for example, be formulated from vinyl esters of carboxylic acids, vinyl aryl and vinyl hydroxyaryl compounds, vinyl halides, styrene and styrene derivatives, allyl compounds, other polymerizable unsaturated acid monomers such as alkylenes, unsaturated acid nitriles, dialkyl esters of maleic acid, isopropenyl esters of carboxylic acids, unsaturated acid amides, and dienes, and one or more unsaturated acid monomers, such as acrylic, methacrylic, crotonic, tiglic, or other unsaturated acid or a derivative thereof (including without limitation alkyl and hydroxyalkyl esters of such acids).

Examples are vinyl compounds typically comprising an $\alpha,\beta$-ethylenically unsaturated vinyl monomer which contains from 2 to 12 carbon atoms. These include esters of acrylic and methacrylic acid, such as methyl methacrylate, ethyl acrylate, ethyl methacrylate, 2-ethylhexyl acrylate, butyl acrylate, butyl methacrylate, 2-hydroxyethyl acrylate, 2-hydroxybutyl methacrylate and the like; styrenic monomers, such as styrene, vinyltoluene, t-butylstyrene, isopropylstyrene, p-chlorostyrene and the like; vinyl esters, such as vinyl acetate, vinyl butyrate, vinyl caprolate and the like; nitrile monomers, such acrylonitrile, methacrylonitrile and the like; vinyl chloride; vinylidene chloride; and the like. In another embodiment, the $C_2$-$C_{12}$ $\alpha,\beta$-ethylenically unsaturated vinyl monomer is butyl acrylate, ethyl acrylate, ethyl methacrylate, methyl methacrylate, vinyl acetate, acrylonitrile, or a mixture thereof. In another embodiment, the $C_2$-$C_{12}$ $\alpha,\beta$-ethylenically unsaturated vinyl monomer is butyl acrylate, ethyl methacrylate, methyl methacrylate, vinyl acetate, or a mixture thereof. In another embodiment, the $C_2$-$C_{12}$ $\alpha,\beta$-ethylenically unsaturated vinyl monomer is butyl acrylate, ethyl methacrylate, vinyl acetate, or a mixture thereof.

Examples of acid components are: an $\alpha,\beta$-ethylenically unsaturated carboxylic acid monomer containing from 3 to 12 carbon atoms, such as acrylic acid, methacrylic acid, crotonic acid, itaconic acid, maleic acid, fumaric acid, angelic acid, glutaconic acid, cinnamic acid, carboxyl cinnamic acid, styrene dicarboxylic acid, and the like. In one embodiment, the $C_3$-$C_{12}$ $\alpha,\beta$-ethylenically unsaturated carboxylic acid monomer is acrylic acid, methacrylic acid, crotonic acid, itaconic acid, maleic acid, fumaric acid, angelic acid, glutaconic acid, or a mixture thereof. In another embodiment, the $C_3$-$C_{12}$ $\alpha,\beta$-ethylenically unsaturated carboxylic acid monomer is methacrylic acid, acrylic acid, itaconic acid, or a mixture thereof. In another embodiment, the $C_3$-$C_{12}$ α,β-ethylenically unsaturated carboxylic acid monomer is methacrylic acid, acrylic acid, or a mixture thereof. Maleic anhydride, 4-vinyl-isobenzofuran-1,3-dione and 5-vinyl-isobenzofuran-1,3-dione are exemplary $C_3$-$C_{12}$ α,β-ethylenically unsaturated carboxylic anhydrides. In another embodiment, the $C_3$-$C_{12}$ α,β-ethylenically unsaturated carboxylic anhydride monomer is maleic anhydride. In another embodiment, the $C_3$-$C_{12}$ α,β-ethylenically unsaturated carboxylic acid or anhydride monomer is maleic anhydride, methacrylic acid, acrylic acid, or a mixture thereof.

As used herein, "alkyl" means a saturated straight chain or branched non-cyclic hydrocarbon having from 1 to 30 carbon atoms. Representative saturated straight chain alkyls include -methyl, -ethyl, -n-propyl, -n-butyl, -n-pentyl, -n-hexyl, -n-heptyl, -n-octyl, -n-nonyl, -n-decyl and the like. Representative saturated branched alkyls include isopropyl, -sec-butyl, -isobutyl, -tert-butyl, -isopentyl, -2-methylbutyl, -3-methylbutyl, -2,2-dimethylbutyl, -2,3-dimethylbutyl, -2-methylpentyl, -3-methylpentyl, -4-methylpentyl, -2-methylhexyl, -3-methylhexyl, -4-methylhexyl, -5-methylhexyl, -2,3-dimethylbutyl, -2,-3-dimethylpentyl, -2,-4-dimethylpentyl, -2,3-dimethylhexyl, -2,4-dimethylhexyl, -2,5-dimethylhexyl, -2,2-dimethylpentyl, -2,2-dimethylhexyl, -3,3-dimethylpentyl, -3,3-dimethylhexyl, -4,4-dimethylhexyl, -2-ethylpentyl, -3,ethylpentyl, -2-ethylhexyl, -3-ethylhexyl, -4-ethylhexyl, -2-methyl-2-ethylpentyl, -2-methyl-3-ethylpentyl, -2-methyl-4-ethylpentyl, -2-methyl-2-ethylhexyl, -2-methyl-3-ethylhexyl, -2-methyl-4-ethylhexyl, -2,2-diethylpentyl, -3,3-diethylhexyl, -2,2-diethylhexyl, -3,3-diethylhexyl and the like.

As used herein, "aryl" means an aromatic hydrocarbon having one or more rings (whether or not fused) wherein at least one of the rings has six or more carbon atoms; the term aryl also includes substituted ring moieties, for example, alkyl-substituted moieties. Representative aryl moieties include phenyl, toluyl, xylenyl and naphthalyl.

More specific examples of suitable monomers are:
vinyl acetate, vinyl propionate, vinyl butyrate, vinyl isobutyrate, vinyl benzoate, vinyl-m-chlorobenzoate, vinyl p-methoxybenzoate, vinyl alpha-chloroacetate, vinyl toluene, vinyl chloride, para vinyl benzyl alcohol, etc.
styrene, alpha-methyl styrene, alpha-ethyl styrene, alpha-bromo styrene, 2,6-dichlorostyrene, etc.;
allyl chloride, allyl acetate, allyl benzoate, allyl methacrylate, etc.;
ethylene, acrylonitrile, methacrylonitrile, dimethyl maleate, isopropenyl acetate, isopropenyl isobutyrate, acrylamide, methacrylamide, 1,3-butadiene, etc.;
acrylic acid, methacrylic acid, methyl acrylate, ethyl acrylate, propyl acrylate, isopropyl acrylate, butyl acrylate, isobutyl acrylate, ethylhexyl acrylate, amyl acrylate, 3,5,5-trimethylhexyl acrylate, methyl methacrylate, ethyl methacrylate, propyl methacrylate, dimethylaminoethyl methacrylate, isobornyl methacrylate, t-butyl methacrylate, ethyl tiglate, methyl crotonate, ethyl crotonate, 2-hydroxyethyl acrylate, 2-hydroxyethyl methacrylate, 2-hydroxypropyl acrylate, 4-hydroxybutyl methacrylate, 2-hydroxypropyl methacrylate, 3-hydroxybutyl acrylate, 4-hydroxybutyl acrylate, 4 hydroxypypentyl acrylate, 2-hydroxyethyl ethacrylate, 3-hydroxybutyl methacrylate, 2-hydroxyethyl chloroacrylate, diethyleneglycol methacrylate, tetra ethylene glycol acrylate, etc.

Preferred hydrophobic latex polymer substances are selected from the group consisting of acrylic polymers, vinyl acrylic polymers, styrenated acrylic polymers, polyolefins, polyurethane dispersions, urethane-acrylic polymer dispersions, silicone modified polyurethane and acrylic-urethane copolymer dispersions, and water dispersible alkyds.

The hydrophobic latex polymer dispersions referred to above can include a water-dispersible polymer component as well. This latter component comprises one or more water dispersible polymers, and can include water borne polymer urethane dispersions, poly(acrylic-urethane) dispersions, silicon modified polyurethane dispersions, silicon modified poly(urethane-acrylic) dispersions, water dispersible alkyd, oil modified water dispersible alkyd, and alkyd modified acrylic polymer dispersions.

The pigments which are useful in practicing the present invention extend across the whole range of color pigments and extender pigments conventionally or otherwise suitable for making latex paint and the films or coatings formed therefrom. Thus, the colorant utilized in the present invention can be a colored pigment which is either an organic pigment or an inorganic pigment; in and of themselves, such pigments are well-known in the art. Organic pigments include phthalocyanine blue, phthalocyanine green, monoarylide yellow, diarylide yellow, benzimidazolone yellow, heterocyclic yellow, DAN orange, quinacridone magenta, quinacridone violet, organic reds, including metallized azo reds and nometallized azo reds, and the like. Exemplary azo reds include lithols, lithol rubine, toluidine red, naphthol red and quinacridone red. Metallized azo reds are salts containing metal cations, such as barium or calcium salts of azo reds, e.g., calcium lithol rubine and barium lithol red. Nonmetallized azo reds are substantially free of metal cations. Inorganic pigments include titanium dioxide white, carbon black, lampblack, black iron oxide, yellow iron oxide, brown iron oxide, red iron oxide and the like.

Similarly, conventional surfactants, dispersants and water-soluble polymers can be utilized in the paint films, latex paints, colorant compositions and methods of the instant invention. These conventional surfactants and dispersants are well-known anionic, cationic, nonionic, and amphoteric surfactants and/or dispersants (including mixtures thereof). More specifically, the conventional anionic, cationic, and nonionic surfactants and dispersants typically have one "hydrophobic head" and one "hydrophilic tail."

The various water-soluble polymers which can be utilized include but are not limited to polycarboxylic acids, copolymers comprising monomers containing a carboxylic acid, alkali soluble emulsion polymers, cellulose derivatives, salts of polyacrylic acids, salts of copolymers comprising monomers containing an acrylic acid, polyvinylpyrrolidone, and copolymers comprising vinylpyrrolidone monomer. In another embodiment, the water-soluble polymer is a salt of a polyacrylic acid, a salt of a copolymer comprising a monomer containing an acrylic acid, or a mixture thereof.

Also, one or more conventional thickeners can be utilized in the various embodiments of the invention. There are several types of thickeners, also known as rheology modifiers or rheology additives, for coatings such as latex paints. One type is non-associative thickeners made of high molecular weight water-soluble polymers. Non-associative thickeners interact with the aqueous phase of latex paints. Exemplary non-associative thickeners include derivatives comprising cellulose, such as those disclosed in U.S. Pat. No. 3,769,247. Another type of thickener is known as an associative thickener, such as a HEUR (or hydrophobically modified ethylene oxide urethane rheology modifier). It is well known that hydrophobic segments of associative thickeners associate with hydrophobic groups of a polymer latex, pigments, and other ingredients of latex paints. Thus, they form a physically cross-linked, shear stress reversible, three-dimensional network.

An additional type of thickener incorporates features of the two types described above by interacting with the aqueous phase while hydrophobically associating with hydrophobic ingredients of latex paints. This type of thickener typically contains hydrophilic polymer chains that interact strongly with water. Attached to these polymer chains are monomers bearing hydrophobic groups that can associate with hydrophobic paint ingredients. Hydrophobically modified alkali swellable/soluble emulsions ("HASE"), each emulsion containing a hydrophobically modified alkali swellable/soluble copolymer ("HASC"), and hydrophobically modified cellulosic thickeners are examples of this type. The number average molecular weight of these dual-acting thickeners is often lower than the number average molecular weight of non-associative thickeners but higher than the number average molecular weight of associative thickeners, such as HEURs.

Preferred thickeners are selected from the group consisting of cellulosics, alkali swellable or soluble polymers, polyacrylamides, nonionic hydrophobically modified ethylene oxide urethane block copolymers, hydrophobically modified alkali soluble polymers, hydrophobically modified cellulosics, hydrophobically modified polyacrylamides, and mixtures thereof.

A polymer surfactant of above-mentioned U.S. application Ser. No. 10/728,599, which can also be incorporated in certain good embodiments of the invention, comprises at least one surfactant monomer and a plurality of hydrophilic monomers such that it confers viscosity stability as aforesaid and often other benefits too, e.g., improved pigment dispersion. These polymer surfactants are typically prepared from the following monomers:

(a) from about 10% to about 80% by weight of at least one $C_3$-$C_{12}$ α,β-ethylenically unsaturated carboxylic acid or anhydride;

(b) from about 10% to about 80% by weight of at least one $C_2$-$C_{12}$, α,β-ethylenically unsaturated vinyl monomer;

(c) from about 0.01% to about 20% by weight of a surfactant monomer or a combination of surfactant monomers; and (d) optionally, up to about 5% by weight of an ethylenically unsaturated cross-linking monomer.

The polymer surfactant can be prepared by solution copolymerization or by emulsion copolymerization. The medium for the polymerization of these monomers can be water or an oxygenated solvent, i.e., an organic molecule containing at least one oxygen atom, such as a glycol. If the medium comprises water, one or more conventional anionic, cationic, nonionic or amphoteric surfactants, or a mixture thereof, can be used to facilitate polymerization in an emulsion polymerization.

For instance, the copolymer surfactants can be prepared by solution polymerization of the monomers through free-radical, stable free-radical (e.g., using the well-known compound TEMPO), anionic or cationic polymerization in a solvent, such as an oxygenated solvent, or in a mixture of solvents. Glycols are examples of suitable oxygenated solvents. Examples of useful glycols include ethylene glycol, propylene glycol, glycerol, diethylene glycol, triethylene glycol, tetraethylene glycol, or other polyethylene glycols of relatively low number average molecular weight, e.g., below about 1,000 Daltons. Cellosolves and cellosolve derivatives, such as cellosolve acetate, can also be used as the oxygenated solvent.

Alternatively the polymer surfactants can be prepared by emulsion polymerization of the monomers in a continuous aqueous phase emulsion using an emulsifier. This can be done by conventional emulsion polymerization at a pH below about 5.0 using one or more conventional free-radical producing initiators, such as ammonium persulfate, sodium persulfate, potassium persulfate, cumene hydroperoxide, tert-butyl hydroperoxide, benzoyl peroxide, acetyl peroxide, lauroyl peroxide, peracetic acid, perbenzoic acid and/or 2,2'-azobisisobutyronitrile. The amount of initiator can be from about 0.05% to about 3.5% by weight, based on total weight of all monomers present, under a relatively inert atmosphere, such as is provided by nitrogen or argon gas, at a temperature of from about 60° C. to about 90° C. (of course, as will be appreciated by those skilled in the art, higher or lower temperatures can be used depending on the type of initiator(s) present). The polymerization can be carried out in a batch-wise or step-wise manner or with continuous addition of monomers in a conventional manner. The surfactant monomers can be fed simultaneously with other monomers, or be fed after a proportion of other monomers has been reacted.

At least one anionic, cationic, nonionic or amphoteric emulsifier can be used in the emulsion copolymerization in which the polymer surfactant is prepared. When more than one emulsifier is present, any additional emulsifier is sometimes known as a co-emulsifier. A wide variety of emulsifiers are known to be available, for example, many are listed in *McCutcheon's Emulsifiers & Detergents*, North American Ed., Manufacturing Confectioner Pub. Co., Glen Rock, N.J., 1988, pp. 1-217. The emulsifier can be nonionic, have an anionic charge, have a cationic charge, or have both an anionic and a cationic charge, e.g., an amphoteric emulsifier, where each charge has associated with it a suitable counter ion; numerous examples of each are known in the art. See Lynn, Jr. et al., "Surfactants" in *Kirk-Othmer Encyc. Of Chem. Technol.*, 4$^{th}$ Ed., John Wiley & Sons, New York, 1997, Vol. 23, pp. 483-541.

A useful class of nonionic emulsifiers is the alkylphenol ethoxylates, such as nonyphenol ethoxylate and the like. Useful anionic emulsifiers include but are not limited to alkali metal alkyl aryl sulfonates, alkali metal alkyl sulfates, the sulfonated alkyl esters, e.g., sodium dodecylbenzene sulfonate, sodium disecondary-butylnaphthalene sulfonate, sodium laurel sulfate, disodium dodecyldiphenyl ether disulfonate, disodium n-octadecylsulfosuccinamate, sodium dioctylsulfosuccinate, and the like. Examples of cationic emulsifiers include but are not limited to amines, e.g., aliphatic mono-, di- and polyamines derived from fatty and rosin acids; and quaternary ammonium salts, e.g., dialkyldimethyl and alkyltrimethyl ammonium salts, alkylbenzyldimethyl ammonium chlorides, and alkylpyridinium halides. Examples of amphoteric emulsifiers include but are not limited to imidazoline derivatives, such as disodium lauroampho diacetate, disodium cocoampho diacetate, sodium cocoampho acetate, sodium cocoampho propionate, sodium lauroampho acetate, disodium cocoampho dipropionate, cocoampho dipropionic acid, sodium capryloampho carboxylate, sodium cocoampho hydroxypropyl sulfonate, sodium capryloampho hydroxypropyl sulfonate, and the like; alkyl betaines, such as lauramidopropyl betaines, coco dimethyl betaine, oleamidopropyl betaine, and the like; sultaines, such as alkylether hydroxypropyl sultaine, cocamidopropyl hydroxy sultaine, and the like; dihydroxyethyl glycinates, such as dihydroxyethyl tallow glycinate and the like; and aminopropionates, such as sodium laurimino dipropionate and the like.

In one embodiment, the emulsifier is of the nonionic type, anionic type, cationic type, amphoteric type, or a mixture thereof. In another embodiment, the emulsifier is of the non-ionic type, anionic type, amphoteric type, or a mixture thereof. In another embodiment, the emulsifier contains a sulfonate, a sulfate, an alkylphenol ethoxylate, or a mixture thereof. In another embodiment, the sulfonate emulsifier is sodium dodecylbenzene sulfonate, sodium disecondary-butylnaphthaline sulfonate, sodium cocoampho hydroxypropyl sulfonate, sodium capryloampho hydroxypropyl sulfonate, or a mixture thereof. In another embodiment, the sulfate emulsifier is sodium lauryl sulfate. In another embodiment, the alkylphenol ethoxylate emulsifier is nonylphenol ethoxylate.

When a copolymer surfactant is prepared by emulsion polymerization, the amount of emulsifier used is typically from 0.2% to about 10% by weight based on the total weight of the emulsion. In another embodiment, when a copolymer surfactant is prepared by emulsion polymerization, the amount of emulsifier used is from about 0.5% to about 10% by weight based on the total weight of the emulsion. In another embodiment, when a copolymer surfactant is prepared by emulsion polymerization, the amount of emulsifier used is from about 0.5% to about 4.0% by weight based on the total weight of the emulsion.

Preferred copolymer surfactants are formed of the following monomers. In such connection, the definitions of terms given above apply, and furthermore for purposes of the instant disclosure "alkylphenyl" means a phenyl group substituted with at least one alkyl group, where alkyl is as defined above. Additionally, "styrylphenyl" means a phenyl group substituted with a styryl group, i.e., a vinyl benzene group where the unsubstituted carbon atom of the vinyl is bonded to the phenyl ring. Thus, in the strictest sense, in a monostyrylphenyl group, one vinyl benzene group is bonded to phenyl; in a distyrylphenyl group, two vinyl benzene groups are bonded to phenyl; and in a tristyrylphenyl group, three vinyl benzene groups are bonding to phenyl. However, it is to be understood that as, e.g., a commercially-available tristyrylphenylpoly(ethyleneoxy)(meth)acrylate (i.e., the compound designated by CAS Reg. Number 174200-85-2) can be a mixture of monostyrylphenylpoly(ethyleneoxy)(meth)acrylate, distyrylphenylpoly(ethyleneoxy)(meth)acrylate and/or tristyrylphenylpoly(ethyleneoxy)(meth)acrylate. As used herein, the term "tristyrylphenyl," when used either alone or as a portion of a chemical name and unless otherwise indicated, includes monostyrylphenyl, distyrylphenyl, tristyrylphenyl, or a mixture of one or more thereof.

Each copolymer surfactant polymeric backbone chain ("chain") comprises at least on hydrophobe, in another embodiment two or more hydrophobes, and a plurality of hydrophiles, such as two or more monomer units of an $\alpha,\beta$-ethylenically unsaturated carboxylic acid or anhydride, copolymerized into the copolymer backbone of the copolymer surfactant. The surfactant monomer contributes towards hydrophobicity, e.g., by its alkyl, alkylphenyl, or tristyrylphenyl groups, thereby facilitating the desired association with various types of hydrophobic groups of pigments and of other coating ingredients.

Multiple surfactant monomers can be present in a copolymer surfactant chain and provide a plurality or combination of the alkyl, alkylphenyl, or tristyrylphenyl hydrophobic groups.

Hydrophilic groups, such as carboxylic acid and/or anhydride groups, impart solubility to the copolymer surfactant in an aqueous phase, when neutralized, and also facilitate the dispersion of inorganic pigments. Other comonomer components of the copolymer surfactant can be used to adjust the balance between the hydrophobicity and hydrophilicity of the copolymer surfactants.

The $C_3$-$C_{12}$ $\alpha,\beta$-ethylenically unsaturated carboxylic acid monomer can be acrylic acid, methacrylic acid, crotonic acid, itaconic acid, maleic acid, fumaric acid, angelic acid, glutaconic acid, cinnamic acid, carboxyl cinnamic acid, styrene dicarboxylic acid, and the like. In one embodiment the $C_3$-$C_{12}$ $\alpha,\beta$-ethylenically unsaturated carboxylic acid monomer is acrylic acid, methacrylic acid, crotonic acid, itaconic acid, maleic acid, fumaric acid, angelic acid, glutaconic acid, or a mixture thereof. In another embodiment, the $C_3$-$C_{12}$ $\alpha,\beta$-ethylenically unsaturated carboxylic acid monomer is methacrylic acid, acrylic acid, itaconic acid, or a mixture thereof. In another embodiment, the $C_3$-$C_{12}$ $\alpha,\beta$-ethylenically unsaturated carboxylic acid monomer is methacrylic acid, acrylic acid, or a mixture thereof. Maleic anhydride, 4-vinyl-isobenzofuran-1,3-dione and 5-vinyl-isobenzofuran-1,3-dione are examples of $C_3$-$C_{12}$ $\alpha,\beta$-ethylenically unsaturated carboxylic anhydrides. In another embodiment, the $C_3$-$C_{12}$ $\alpha,\beta$-ethylenically unsaturated carboxylic anhydride monomer is maleic anhydride. In yet another embodiment, the $C_3$-$C_{12}$ $\alpha,\beta$-ethylenically unsaturated carboxylic acid or anhydride monomer is maleic anhydride, methacrylic acid, acrylic acid, or a mixture thereof.

The $C_2$-$C_{12}$ $\alpha,\beta$-ethylenically unsaturated vinyl monomer can be an ester of acrylic and methacrylic acid, such as methyl methacrylate, ethyl acrylate, ethyl methacrylate, 2-3ethylhexyl acrylate, butyl acrylate, butyl methacrylate, 2-hydroxyethyl acrylate, 2-hydroxybutyl methacrylate and the like; a styrenic monomer, such as styrene, vinyltoluene, t-butylstyrene, isopropylstyrene, p-chlorostyrene and the like; a vinyl ester, such as vinyl acetate, vinyl butyrate, vinyl caprolate and the like; a nitrile monomer, such as acrylonitrile, methacrylonitrile and the like; or vinyl chloride; vinylidene chloride, and the like. In another embodiment, the $C_2$-$C_{12}$ $\alpha,\beta$-ethylenically unsaturated vinyl monomer can be butyl acrylate, ethyl acrylate, ethyl methacrylate, methyl methacrylate, vinyl acetate, acrylonitrile, or a mixture thereof. In another embodiment, the $C_2$-$C_{12}$ $\alpha,\beta$-ethylenically unsaturated vinyl monomer can be butyl acrylate, ethyl acrylate, ethyl methacrylate, methyl methacrylate, vinyl acetate, or a mixture thereof. In another embodiment, the $C_2$-$C_{12}$ $\alpha,\beta$-ethylenically unsaturated vinyl monomer can be butyl acrylate, ethyl methacrylate, methyl methacrylate, vinyl acetate, or a mixture thereof. In another embodiment, the $C_2$-$C_{12}$ $\alpha,\beta$-ethylenically unsaturated vinyl monomer is butyl acrylate, ethyl methacrylate, vinyl acetate, or a mixture thereof.

The surfactant monomer is at least one acrylic ester or methacrylic ester, i.e., a (meth)acrylic ester of an ethoxylated moiety, such as alkyl, alkylphenyl, monostyrylphenyl, distyrylphenyl, tristyrylphenyl and the like, have the structure:

$$H_2C=C(X)-C(O)O-E-R \qquad (I)$$

where X is hydrogen or methyl, E is ethoxylate, i.e., a hydrophilic moiety, and R is alkyl, alkylphenyl, monostyrylphenyl, distyrylphenyl or tristyrylphenyl, i.e., a hydrophobic moiety. Surfactant monomers can include the acrylic or methacrylic acid esters of nonionic surfactant alcohols, such as alkylpolyethyleneoxy(meth)acrylates or alkylphenylpolyethyleneoxy(meth)acrylates, where the alkyl group contains, independently, from 1 to 30 carbon atoms, and the tristyrylphenylpoly(ethyleneoxy)(meth)acrylates. (It is to be understood that the term "tristyrylphenyl," has the same meaning as previously discussed.) In another embodiment, the alkylpolyethyleneoxy(meth)acrylate or alkylphenylpolyethyleneoxy(meth)acrylate has an alkyl group which contains, independently, from 1 to 22 carbon atoms. In another embodiment, the alkylpolyethyleneoxy(meth)acrylate or alkylphenylpolyethyleneoxy(meth)acrylate has an alkyl group which contains, independently, from 9 to 22 carbon atoms.

In another embodiment, the surfactant monomer is nonylpoly(ethyleneoxy)acrylate, decylpoly(ethyleneoxy)acrylate, undecylpoly(ethyleneoxy)acrylate, oleylpoly(ethyleneoxy)methacrylate, behenylpoly(ethyleneoxy)methacrylate, tristyrylphenylpoly(ethyleneoxy)methacrylate, or a mixture thereof. In another embodiment, the surfactant monomer is behenylpoly(ethyleneoxy)acrylate, behenylpoly(ethyleneoxy)methacrylate, decylpoly(ethyleneoxy)acrylate, decylpoly(ethyleneoxy)methacrylate, tristyrylphenylpoly(ethyleneoxy)acrylate, tristyrylphenylpoly(ethyleneoxy)methacrylate, or a mixture thereof. In another embodiment, the surfactant monomer is behenylpoly(ethyleneoxy)methacrylate, decylpoly(ethyleneoxy)acrylate, tristyrylphenylpoly(ethyleneoxy)acrylate, tristyrylphenylpoly(ethyleneoxy)methacrylate, or a mixture thereof. In another embodiment, the surfactant monomer is tristyrylphenylpoly(ethyleneoxy)acrylate, tristyrylphenylpoly(ethyleneoxy)methacrylate, or a mixture thereof. In another embodiment, the surfactant monomer is tristyrylphenylpoly(ethyleneoxy)acrylate. In another embodiment, the surfactant monomer is tristyrylphenylpoly(ethyleneoxy)methacrylate. In each of the above embodiments relating to a surfactant monomer containing ethyleneoxy groups, the number of ethylene oxide units present is from about 4 to about 200. Alternatively, in each of the above embodiments relating to a surfactant monomer containing ethyleneoxy groups, the number of ethylene oxide units present is from about 4 to about 60, or from about 10 to about 40.

Optionally, one or more cross-linking monomers can be used, for example, to modify the molecular weight of a copolymer surfactant. The cross-linking monomers are ethylenically unsaturated monomers comprising a plurality of ethylenically unsaturated groups, such as diallyl phthalate, vinyl crotonate, allyl methacrylate, divinyl benzene, N,N'-methylene-bis-acrylamide, ethylene glycol diacrylate, ethylene glycol dimethacrylate, 1,6-haxanediol diacrylate, and the like. In another embodiment, a cross-linking monomer is absent. When present, the one or more ethylenically unsaturated cross-linking monomers can be utilized at a concentration of up to about 5% by weight, based on the total weight of all monomers present in the copolymer surfactant, for example, at a concentration of up to about 2% by weight or about 1% by weight, based on the total weight of all monomers present in the copolymer surfactant.

The copolymer surfactant can have a number average molecular weight of from about 400 Daltons to about 500,000 Daltons, for example, from about 400 to about 200,000 Daltons.

The copolymer surfactant can contain a single hydrophobic group per polymer chain or a plurality of (i.e., two or more) hydrophobic groups, each of which can be the same or different, per polymer chain. The copolymer surfactant thus can be a di-hydrophobe and contain two hydrophilic groups, which can be the same or different, per polymer chain.

The features and advantages of certain embodiments of the present invention will be further apparent from the following examples.

EXAMPLE 1

Hydrophobic Latex Polymer

A hydrophobic latex polymer contains about 45% solids contents. The polymer is formulated from the following monomers:

| Components | Parts (by weight) |
|---|---|
| Butyl Acrylate | 9 |
| Methacrylic Acid | 6 |
| Methyl Methacrylate | 20 |
| Styrene | 46 |
| 2-Ethyl hexylacrylate | 19 |

EXAMPLE 2

Viscosity Stabilizing Copolymer Surfactant

A copolymer surfactant functioning as a viscosity stabilizer was prepared by emulsion polymerization. The emulsion polymerization reaction was carried out in a four-neck flask of about 4 L (1 U.S. gallon) capacity under nitrogen purge. The flask was equipped with a condenser, a thermometer, an agitator and a feeding pump; it was immersed in a temperature controlled water bath maintained at a constant temperature within about ±0.1° C. of the set point. The ingredients listed below were combined as described hereinafter to formulate the copolymer surfactant:

| Component | Parts (by weight) |
|---|---|
| Initial Charge in Reactor | |
| Deionized water | 46.4 |
| Ammonium nonylphenyl ether persulfate | 0.1 |
| Monomer Emulsion | |
| Deionized water | 13.9 |
| Ammonium nonylphenyl ether persulfate | 0.5 |
| Mixed surfactant (ABEX 2020) | 1.2 |
| Methacrylic acid | 9.6 |
| Vinyl acetate | 8.5 |
| Butyl acrylate | 3.6 |
| Ethyl methacrylate | 5.3 |
| Tristyrylphenylpoly(ethyleneoxy) methacrylate | 2.9 |
| Ethylene glycol diacrylate | 0.03 |
| Initiator Solution 1 | |
| Ammonium persulfate | 0.06 |
| Deionized water | 2.6 |
| Initiator Solution 2 | |
| Ammonium persulfate | 0.07 |
| Deionized water | 3.0 |
| Ammonium nonylphenyl ether persulfate | 0.13 |
| Mixed surfactant (ABEX 2020) | 0.3 |
| Rinse | |
| Deionized water | 1.8 |
| Total | 100.0 |

Deionized water and the surfactant ammonium nonylphenyl ether persulfate (CO 436, obtained from Rhodia Inc. (Cranbury, N.J.) were charged into the reaction flask and its contents were heated to 80° C. At 80° C., 6% of monomer emulsion, containing the mixed surfactant ABEX 2020, a proprietary formulation obtained from Rhodia Inc. and believed to comprise a mixture of an anionic surfactant and a nonionic surfactant, was charged into the reaction flask and held for 10 minutes. Thereafter, initiator solution 1 was charged into the reaction flask and held for 15 minutes. Initiator solution 2 and the remaining monomer emulsion were then fed into the reaction flask over a period of from about 3 to about 4.5 hours. After feeding was complete, the feeding line was rinsed or flushed with water; the rinse water also entered the reaction flask. The temperature of the reaction flask was maintained at 80-85° C. for one hour after which it was cooled to about 25° C. and the copolymer surfactant product, in the form of a latex or emulsion, was recovered. The copolymer surfactant had a number average molecular weight of about 100,000 Daltons.

It was noted that upon addition of a base, such as ammonia or sodium hydroxid, the copolymer surfactant of the latex dissolved in the aqueous phase, thereby indicating that the latex containing this copolymer surfactant is a hydrophobically modified alkali soluble emulsion.

EXAMPLE 3

Red Oxide Color Concentrate

To a one liter stainless beaker equipped with a stirrer, under slow agitation 500 rpm), were added in the following order:

| | |
|---|---|
| Water | 175 parts |
| PEG 400 (polyethylene glycol - MW: 400) | 53 parts |
| NuoSept 95 biocide (International Specialty Products) | 2.5 parts |
| Morton 132 (water-dispersible polymer - Rohm & Haas) | 50 parts |
| Surfynol CT 151 (anionic dispersant - Air Products) | 22 parts |
| Triton X-100 (nonionic surfactants - Dow/Union Carbide) | 15 parts |
| Red oxide (pigment) | 830 parts |
| L-475 Defoamer (Dow/Union Carbide) | 1 part |

Mixing at 500 RPM was continued for 10 minutes. The agitation rate was increased to 2500 rpm for 30 minutes. Then, the agitation rate was reduced to 500 rpm, and further ingredients added in the following order:

| | |
|---|---|
| Water | 240 parts |
| L-475 Defoamer | 1 part |
| Ammonium hydroxide | 7.8 parts |
| Styrene acrylic latex of Example 1 above (hydrophobic latex polymer) | 75 parts |
| Copolymer surfactant of Example 2 above (viscosity stabilizer) | 20 parts |

EXAMPLE 4

Magenta Color Concentrate

The following ingredients were added in the order listed below to the same equipment and under the same conditions, as described in Example 3:

| | |
|---|---|
| Water | 250 parts |
| PEG 400 | 25 parts |
| NuoSept 95 | 2.5 parts |
| Morton 132 | 30 parts |
| Tego Disperse 650 (wetting additive - Tego Chemie) | 14 parts |
| Dextrol OC 180 (phosphate surfactant) | 16 parts |
| Quindo Mag RV6844 (pigment) | 160.5 parts |
| Aerosil R972 (fumed silica) | 5 parts |
| L-475 Defoamer | 5 parts |

Again, mixing was continued at 500 rpm, after which the agitation rate was increased to 2500 rpm for 40 minutes of grinding. Then, the agitation rate was reduced to 500 RPM, and further ingredients added in the following order:

| | |
|---|---|
| Water | 253 parts |
| L-475 Defoamer | 5 parts |
| Styrene acrylic latex (hydrophobic latex polymer) | 100 parts |
| Ammonium hydroxide | 5 parts |
| Copolymer surfactant of Example 2 above (viscosity stabilizer) | 25 parts |

Thereafter, the color composition was processed through a sand mill (Model L-3-J, Chicago Boiler Co., Buffalo Grove, Ill.) using 1.00 mm diameter glass beads as the grinding medium.

EXAMPLE 5

Red Oxide Color Concentrate

The following ingredients were added in the order listed below to the same equipment, and under the same conditions, as described in Example 3:

| | |
|---|---|
| Water | 175 parts |
| PEG 400 | 53 parts |
| NuoSept 95 | 2.5 parts |
| Morton 132 | 50 parts |
| Surfynol CT 151 | 22 parts |
| Triton X-100 | 15 parts |
| Red Oxide 1299D | 830 parts |
| L-475 Defoamer | 1 part |

Grinding was carried out for 20 minutes. Then, further ingredients were added in the following order:

| | |
|---|---|
| Water | 240 parts |
| L-475 Defoamer | 1 part |
| Ammonium hydroxide | 7.8 parts |
| 803AN (latex) | 75 parts |
| 803-AH (latex) | 20 parts |
| Total | 1492.3 parts |

EXAMPLE 6

Magenta Color Concentrate

The following ingredients were added in the order listed below to the same equipment, under the same conditions, as mentioned in Example 4:

| | |
|---|---|
| Water | 277.309 parts |
| PEG 400 | 38 parts |
| NuoSept 95 | 2.5 parts |
| Morton 132 | 40 parts |
| Tego Disperse 650 | 14 parts |
| Dextrol OC 180 | 16 parts |
| Strodex PK 0VOC | 10 parts |
| Quindo Mag RV6844 | 160.5 parts |
| L-475 Defoamer | 5 parts |

The materials were then ground at RPM for 40 minutes. Then, with the agitation rate at 500 RPM, further ingredients were added in the following order:

| | |
|---|---|
| Water | 265.5 parts |
| L-475 Defoamer | 5 parts |
| 803-AN (latex) | 75 parts |
| Ammonium hydroxide | 4 parts |
| 803AH (latex) | 33 parts |
| Total | 945.8 parts |

Thereafter, the color composition was processed through a sand mill (Model L-3-J, Chicago Boiler Co., Buffalo Grove, Ill.) using 1.00 mm diameter glass beads as the grinding medium.

EXAMPLE 7

Base Composition

An acrylic semi-gloss latex base composition was formulated by combining the following components:

| Component | Parts (by weight) |
|---|---|
| Water | 18 |
| Propylene Glycol | 4 |
| 250 MBR (cellulosics) | 0.5 |
| Tamol 681 | 0.75 |
| Calcium Carbonate | 20 |
| FoamMaster PL | 0.1 |
| Yong Yang Jul. 19, 2005 | 2 |

These components were ground for 10 minutes, and then the following additional components included

| | |
|---|---|
| Triton X-100 | 0.5 |
| Propylene Glycol | 1 |
| Texanol | 2.5 |
| Ammonia | 0.25 |
| Rohm and Haas latex polymer SG-10M | 59 |
| RM-2020 (thickener) | 3.5 |
| RM-825 (thickener) | 1.06 |
| Water | 6.8 |
| Isopar L (solvent) | 1 |
| FormMaster PL | 0.75 |

A Stormer Viscomter, Krebs-Tuype, (BYK-Gardner, ASTM) and a I.C.I. Cone and Plate Viscometer (BYK-Gardner, ASTM D 4287) were used to measure the viscosity of the tint-base. It has a Stormer viscosity of 95 Krebs Units and I.C.I. viscosity of 1.1 poise.

All publications mentioned herein are incorporated by reference. Unless otherwise stated, all "percent" and "part(s)" set forth herein are by weight, i.e., weight percent and parts by weight.

While the foregoing disclosure describes the invention as appropriate, it will be appreciated that numerous modifications and variations (including equivalents) may be devised by those of ordinary skill in the art once in possession of the teachings herein. It is intended that the claims be deemed to cover all such modifications and variations (including equivalents) as fall within the true spirit and scope of the present invention.

What is claimed is:

1. A colorant composition, suitable for combining with a component comprising a film-forming binder latex to form a latex paint, including a surfactant, a dispersant, or a surfactant and a dispersant, at least one said surfactant or dispersant present in the composition having one or more hydrophilic segments and one or more hydrophobic segments, which colorant composition comprises:
    water;
    a tinting colorant suitable for formulating a tinted latex paint; and
    a component including an amount of at least one hydrophobic latex polymer which when aggregated in said latex paint with an effective amount of said binder latex would constitute a total mass of latex greater than required for forming a latex paint film when dry, said amount of at least one hydrophobic latex polymer being effective in said latex paint film to mitigate water-softening and/or water-staining of said film, when dry, by at least 25% in comparison to the water-softening and/or water-staining which would otherwise be exhibited in the absence of said amount of at least one hydrophobic latex polymer;
    said colorant composition not including a pigment which is a non-tinting colorant.

2. The composition as defined in claim 1, wherein said amount of hydrophobic latex polymer is of from 0.25 to 25 weight percent of an aggregate of constituents of the composition.

3. The composition as defined in claim 2, wherein said amount of hydrophobic latex polymer is of from 0.5 to 20 weight percent of an aggregate of constituents of the composition.

4. The composition as defined in claim 3, wherein said amount of hydrophobic latex polymer is of from 0.75 to 15 weight percent of an aggregate of constituents of the composition.

5. The composition as defined in claim 1, wherein each said hydrophobic latex polymer is selected from the group consisting of acrylic polymers, vinyl acrylic polymers, styrenated acrylic polymers, polyolefins, polyurethane dispersions, urethane-acrylic polymer dispersions, silicone modified polyurethane or acrylic-urethane copolymer dispersions, and water dispersible alkyds.

6. The composition as defined in claim 1, wherein said amount of hydrophobic latex polymer comprises at least two hydrophobic latex polymers.

7. The composition as defined in claim 1, which further comprises at least one thickener.

8. The composition as defined in claim 7, wherein each said at least one thickener is selected from the group consisting of cellulosics, alkali swellable or soluble polymers, polyacrylamides, nonionic hydrophobically modified ethylene oxide urethane block copolymers, hydrophobically modified alkali soluble polymers, hydrophobically modified cellulosics, hydrophobically modified polyacrylamides, and mixtures of two or more thereof.

9. The colorant composition as defined in claim 1, wherein said amount of at least one hydrophobic latex polymer is effective to mitigate said water-softening and/or water-staining by at least 50% in comparison to the water-softening and/or water staining which would otherwise be exhibited in the absence of the amount of said at least one hydrophobic latex polymer.

10. The colorant composition as defined in claim 9, wherein said amount of at least one hydrophobic latex polymer is effective to mitigate said water-softening and/or water-staining by at least 80% in comparison to the water-softening and/or water staining which would otherwise be exhibited in the absence of the amount of said at least one hydrophobic latex polymer.

11. A method of making a colorant composition suitable for combining with a component comprising a film-forming binder latex to form a latex paint including a surfactant, a dispersant, or a surfactant and a dispersant, at least one said surfactant or dispersant present in the composition having one or more hydrophilic segments and one or more hydrophobic segments, which method comprises mixing: water; at least one tinting colorant suitable for formulating a tinted latex paint; and a component including an amount of at least one hydrophobic latex polymer which when aggregated in said latex paint with an effective amount of said binder latex would constitute a total mass of latex greater than required for forming a latex paint film when dry, said amount of at least one hydrophobic latex polymer being effective in said latex paint film to mitigate the water-softening and/or water-staining of said film, when dry, by least 25% in comparison to the water-softening and/or water-staining which would otherwise be exhibited in the absence of said amount of at least one hydrophobic latex polymer; said method not including the incorporation of a pigment which is a non-tinting colorant.

12. The method of making a composition as defined in claim 11, which further comprises adding at least one oxygenated solvent and at least one extender pigment.

13. The method of making a composition as defined in claim 12, which further comprises at least one thickener.

14. The method of making a composition as defined in claim 13, wherein each said thickener is selected from the group consisting of cellulosics, alkali swellable or soluble polymers, polyacrylamides, nonionic hydrophobically modified ethylene oxide urethane block copolymers, hydrophobically modified alkali soluble polymers, hydrophobically modified cellulosics, hydrophobically modified polyacrylamides, and mixtures of two or more thereof.

15. The method of making a composition as defined in claim 11, wherein said hydrophobic latex polymer is present in the colorant composition in an amount such that the latex paint has of from 0.025 to 15 weight percent based on an aggregate of constituents of the latex paint.

16. The method as defined in claim 11, wherein said amount of at least one hydrophobic latex polymer is effective to mitigate said water-softening and/or water-staining by at least 50% in comparison to the water-softening and/or water staining which would otherwise be exhibited in the absence of the amount of said at least one hydrophobic latex polymer.

17. The method as defined in claim 16, wherein said amount of at least one hydrophobic latex polymer is effective to mitigate said water-softening and/or water-staining by at least 80% in comparison to the water-softening and/or water staining which would otherwise be exhibited in the absence of the amount of said at least one hydrophobic latex polymer.

* * * * *